United States Patent
Volk et al.

(10) Patent No.: US 7,406,379 B2
(45) Date of Patent: Jul. 29, 2008

(54) SYSTEM FOR INTERFEROMETRIC SENSING

(75) Inventors: Charles H. Volk, Newbury Park, CA (US); James R. Huddle, Chatsworth, CA (US); Daniel A. Tazartes, West Hills, CA (US); Jerome S. Lipman, deceased, late of Sherman Oaks CA (US); by Maureen Lipman, legal representative, Sherman Oaks, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 519 days.

(21) Appl. No.: 11/125,044

(22) Filed: May 9, 2005

(65) Prior Publication Data

US 2005/0267675 A1    Dec. 1, 2005

(51) Int. Cl.
*G01C 21/26* (2006.01)
*G01C 21/30* (2006.01)

(52) U.S. Cl. .................................. 701/200; 701/213

(58) Field of Classification Search ................ 701/200, 701/213–215, 207; 340/988; 342/357.01, 342/450
See application file for complete search history.

(56) References Cited

U.S. PATENT DOCUMENTS 6,424,914 B1 * 7/2002 Lin ............................. 701/214

2004/0030464 A1    2/2004 Buchter et al.

FOREIGN PATENT DOCUMENTS

| EP | 0 484 202 A1 | 5/1992 |
| FR | 2 739 183 A1 | 3/1997 |
| WO | WO 95/18977 A | 3/1995 |

* cited by examiner

Primary Examiner—Yonel Beaulieu
(74) Attorney, Agent, or Firm—Patti, Hewitt & Arezina LLC

(57) ABSTRACT

An exemplary navigation system uses a master navigation component at a first location with a first sensor in a vehicle and a slave navigation component with a second sensor at a second location that is a variable displacement to the first location due to physical deformation of the vehicle. Static and dynamic location components provide static and dynamic information of the displacement between the first and second locations. A flexural model based on the deformation characteristics calculates the dynamic displacement. An error estimator estimates errors in the navigation measurement data of the slave navigation component based on the displacement information. The master navigational component corrects the navigation measurement data of the slave navigation component based on the determined error, translates the corrected navigation measurement data of the slave navigation component into navigation measurement data in its coordinate system, and combines the output of the second sensor based on the corrected navigation measurement data with the output of the first sensor into a combined result.

36 Claims, 6 Drawing Sheets

SYSTEM FOR INTERFEROMETRIC SENSING

BACKGROUND

Multiple sensors of a sensing system are distributed in a vehicle to provide enhanced measurement capabilities and resolution of data by common observation of one or more emitters, transmitters, or reflectors, for example, a common target. The common target in one example comprises a vehicle, a ground installation, or a satellite. Through techniques such as interferometry, the multiple sensors determine one or more parameters of the common target, for example, location and/or shape of the common target. The accuracy to which the multiple sensors determine the parameters of the common target depends how accurately the location of each of the multiple sensors is known. The vehicle comprises a high performance navigation system to provide velocity, position, and attitude of the vehicle relative to a reference coordinate system. The navigation system is mounted in the vehicle but is usually physically separated from the sensors. The navigation system establishes navigation and orientation solutions for the vehicle relative to the reference coordinate system.

The positions of the sensors are calculated based on known static rigid distances between the navigation system and the sensors and the navigation and orientation solutions for the vehicle. As the vehicle is in motion, the vehicle bends. The bending of the vehicle causes instantaneous discrepancies between the position expressed by the master navigation system and the position experienced by the sensor. The difference between the position expressed by the master navigation system and the position experienced by the sensor is the "lever arm error." The lever arms between the master navigation system and the sensing systems are nominally known. As one shortcoming, due to bending of the vehicle, errors are induced into the velocity, position, and orientation of the sensing system where outputs of the master navigation system are corrected based on the nominal lever arms.

One prior art solution to reduce the level arm error is to employ a smaller, lightweight, lower performance navigation system at the sensors of the sensing system. The navigation system at the sensors determines the velocity, position, and attitude of the sensors in a coordinate system relative to the sensors. As yet another shortcoming, the coordinate system defined by the navigation system at the sensor may differ from the coordinate system defined by the navigation system of the vehicle. As yet another shortcoming, spatial constraints of the vehicle may prohibit the addition of navigation systems at all the sensors. It is desirable to determine the position of all the sensors to obtain accurate measurements from all the sensors.

Thus, a need exists for accurately determining positions of all sensors in a vehicle while the vehicle is in motion.

DESCRIPTION OF THE DRAWINGS

Features of exemplary implementations of the invention will become apparent from the description, the claims, and the accompanying drawings in which:

DETAILED DESCRIPTION

Figure 1:
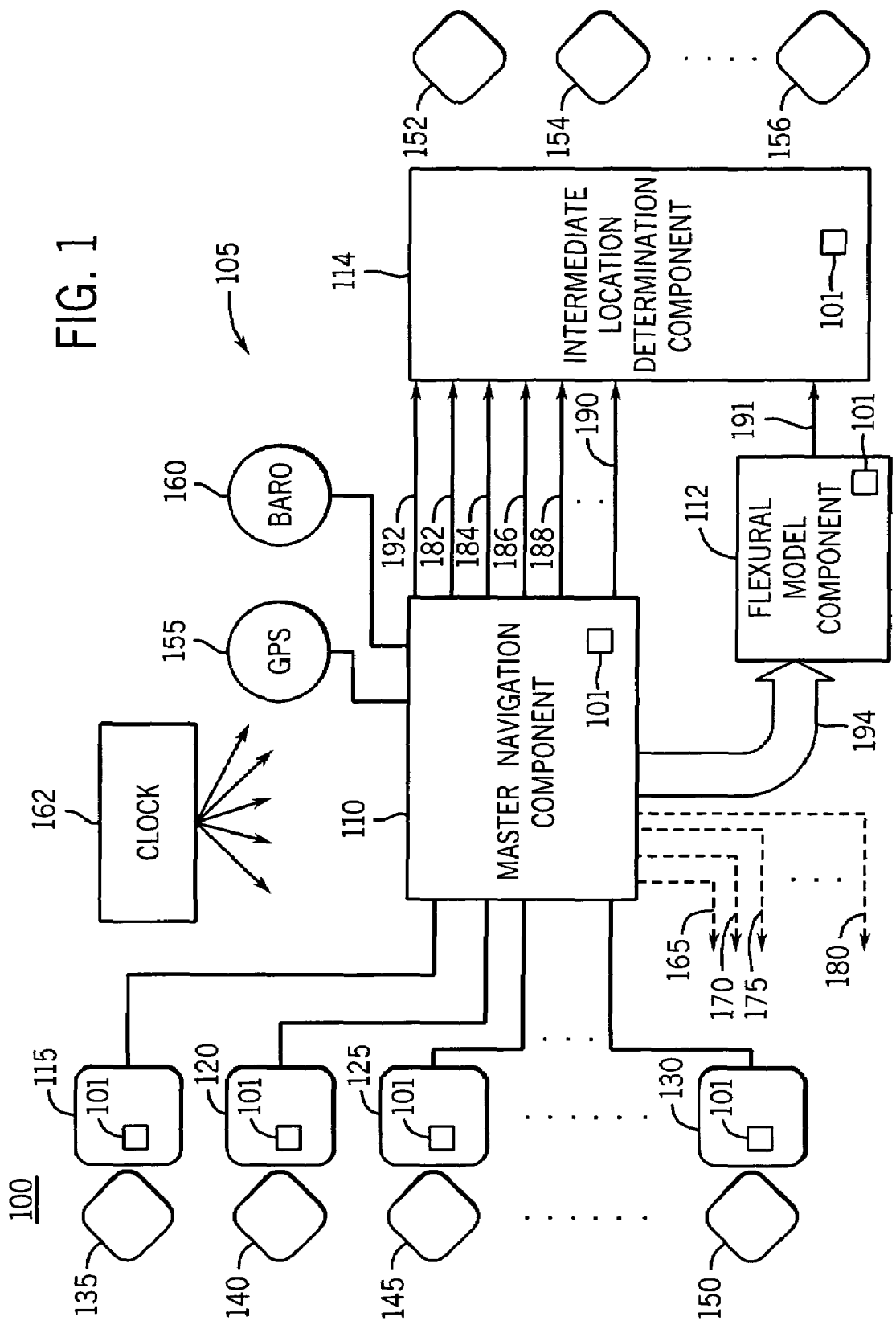
FIG. 1 is a representation of one implementation of an apparatus that comprises one or more vehicles, one or more master navigation components, one or more slave navigation components, one or more sensors, one or more external positioning components, one or more flexural model components, and one or more intermediate location determination components.

Turning to FIG. 1, an apparatus 100 in one example comprises one or more vehicles 105, one or more master navigation components 110, one or more flexural model components 112, one or more intermediate location determination components 114, one or more slave navigation components 115, 120, 125, and 130, one or more sensors 135, 140, 145, 150, 152, 154, and 156, and one or more external positioning components 155 and 160. The vehicle 105 in one example comprises a car, a tank, an airplane, an airship, or a space vehicle. The master navigation component 110 in one example comprises a high performance navigation system to provide velocity, position, and attitude of the vehicle 105. The master navigation component 110 employs accelerometers and gyroscopes to determine the velocity, position, and attitude of the vehicle 105. For example, the master navigation component 110 comprises an Inertial Navigation System ("INS").

The slave navigation components 115, 120, 125, and 130 in one example comprise one or more inertial sensors, for example, three linear accelerometers and three gyroscopes, to determine position and attitude of the sensors 135, 140, 145, 150, 152, 154, and 156. For example, the slave navigation components 115, 120, 125, and 130 comprise one or more Inertial Measurement Units ("IMUs"), as will be understood by those skilled in the art. The slave navigation components 115, 120, 125, and 130 and the sensors 135, 140, 145, 150, 152, 154, and 156 are located in the vehicle 105. For example, the slave navigation components 115, 120, 125, and 130 and the sensors 135, 140, 145, 150, 152, 154, and 156 are located along the edge of a wing of an airplane. The sensors 135, 140, 145, 150, 152, 154, and 156 comprise one or more synthetic aperture radars, one or more optical sensors, or one or more acoustic sensors. The sensors 135, 140, 145, and 150 in one example are associated with the slave navigation components 115, 120, 125, and 130, respectively. The sensors 152, 154, and 156 in one example are located in between one or more of the sensors 135, 140, 145, and 150. The master navigation component 110, the slave navigation components 115, 120, 125, and 130, the flexural model component 112, and the intermediate location determination component 114, comprise an instance of a recordable data storage medium 101, as described herein.

The flexural model component 112 comprises a model that describes the flexing, or bending, of the structure of the vehicle 105 as a function of time while the vehicle 105 is in motion. Based on estimations of the positions of the slave navigation components 115, 120, 125, and 130, the flexural model component 112 expresses the relative displacement of any point along the structure of the vehicle. For example, the flexural model component 112 takes as input one or more lever arm parameters 194 of the distances between the master navigation component 110 and the slave navigation components 115, 120, 125, and 130 as a function of time. The flexural model component 112 comprises one or more equations describing the reaction of the vehicle 105 during motion. For example, the flexural model component 112 comprises equations describing the bending of the structure of the vehicle 105 as a function of time. The flexural model component 112 applies lever arm parameters 194 to the equations to generate an equation describing the relative displacement of any sensor along the structure of the vehicle 105 as a function of time. In one example, the flexural model component 112 is programmed with the equations describing the bending of the structure of the vehicle 105 as a function of time. In another example, the flexural model component 112 employs one or more neural networks that cooperate to describe displacement of the sensors 135, 140, 145, and 150 relative to one another. The flexural model component 112 provides as output 191, equations describing the relative displacement of any sensor along the structure of the vehicle 105 as a function of time.

The intermediate location determination component 114 determines positions of sensors that are not associated with a slave navigation component, for example, the sensors 152, 154, and 156. The intermediate location determination component 114 determines the relative position of a sensor in relationship to one or more sensors associated with a slave navigation component. The intermediate location determination component 114 applies the relative position of the sensor to the equation describing the relative displacement of any sensor along the structure of the vehicle 105 to produce the position of the sensor relative to a coordinate system established by the master navigation component 110. The external positioning components 155 and 160 in one example comprise a Global Positioning System ("GPS") receiver and a baro-altimeter, respectively.

The master navigation component 110 employs one or more sensors to determine navigation measurement data for the vehicle 105. The navigation measurement data for the vehicle 105 in one example comprises: inertial measurement data, positioning measurement data, air speed measurement data, and/or pressure altitude measurement data. In one example, the master navigation component 110 employs one or more inertial sensors to determine inertial measurement data for the vehicle 105. In another example, the master navigation component 110 employs one or more pressure altitude sensors to determine pressure altitude measurement data for the vehicle 105. In yet another example, the master navigation component 110 employs one or more GPS units to determine GPS measurements for the vehicle 105. In yet another example, the master navigation component 110 employs one or more air speed sensors to determine air speed measurements for the vehicle 105. The master navigation component 110 employs the navigation measurement data to determine a navigation and orientation solution for the vehicle 105 that describes the location/position of the vehicle 105 with respect to a reference coordinate system, for example, the Earth.

The master navigation component 110 establishes a coordinate system, for example, a first coordinate system, with respect to the reference coordinate system based on the navigation measurement data for the vehicle 105, as will be understood by those skilled in the art. In one example, the master navigation component 110 employs data from the external position component 155, for example, GPS data, pressure altitude, or air data, to establish the coordinate system, as will be appreciated by those skilled in the art. In another example, the master navigation component 110 employs navigation measurement data from the slave navigation components 115, 120, 125, and 130, and positioning information from the external positioning components 155 and 160 to establish the coordinate system for the vehicle 105. In yet another example, the master navigation component 110 employs the navigation measurement data from the slave navigation components 115, 120, 125, and 130 to further refine the coordinate system established by the master navigation component 110 for the vehicle 105. The master navigation component 110 employs the coordinate system and the navigation measurement data for the vehicle 105 to describe the orientation of the vehicle 105 as a function of time.

The master navigation component 110 establishes a coordinate system, for example, a first coordinate system, with respect to the reference coordinate system based on the navigation measurement data for the vehicle 105, as will be understood by those skilled in the art. The master navigation component 110 employs the coordinate system and the navigation measurement data for the vehicle 105 to describe the orientation of the vehicle 105 as a function of time. The master navigation component 110 in one example employs data from the external position component 155, for example, GPS data, pressure altitude, or air data, to establish the coordinate system, as will be appreciated by those skilled in the art. In another exemplary embodiment of the apparatus 100, the master navigation component 110 employs navigation measurement data from the slave navigation components 115, 120, 125, and 130, and positioning information from the external positioning components 155 and 160 to establish and further refine the coordinate system for the vehicle 105.

The master navigation component 110 communicates with the slave navigation components 115, 120, 125, and 130 to describe the position of the sensors 135, 140, 145, and 150 relative to the coordinate system established by the master navigation component 110. The master navigation component 110 obtains navigation measurement data, for example, navigation measurement data, for the positions of the sensors 135, 140, 145, and 150 as a function of time from the slave navigation components 115, 120, 125, and 130. The master navigation component 110 comprises one or more error estimation components, for example, one or more Kalman filters, to estimate one or more errors in the navigation measurement data of the slave navigation components 115, 120, 125, and 130. The master navigation component 110 corrects the navigation measurement data of the slave navigation components 115, 120, 125, and 130 based on the errors. The master navigation component 110 provides the corrected navigation measurement data to the slave navigation components 115, 120, 125, and 130, as illustrated by outputs 165, 170, 175, and 180. The slave navigation components 115, 120, 125, and 130 employ the corrected navigation measurement data to improve estimations of navigation parameters (e.g., orientation, position, and velocity) of the sensors 135, 140, 145, and 150.

The master navigation component 110 translates the navigation measurement data of the slave navigation components 115, 120, 125, and 130 from coordinate systems established by the slave navigation components 115, 120, 125, and 130, for example, one or more second coordinate systems, to the coordinate system established by the master navigation component 110, for example, the first coordinate system, as will be appreciated by those skilled in the art. The master navigation component 110 provides navigational parameters for the master navigation component 110 as output 182. The master navigation component 110 provides translated navigation parameters for the sensors 135, 140, 145, and 150 in the coordinate system established by the master navigation component 110 as illustrated by the outputs 184, 186, 188, and 190. The master navigation component 110 provides the orientation of the coordinate reference system as output 192.

The master navigation component 110 estimates the lever arm parameters 194 (i.e. parameters used to model three dimensional distance vectors) between the master navigation component 110 and the slave navigation component 115, the master navigation component 110 and the slave navigation component 120, the master navigation component 110 and the slave navigation component 125, and the master navigation component 110 and the slave navigation component 130. The slave navigation components 115, 120, 125, and 130 employ the estimation of the lever arms to determine dynamic motion of the sensors 135, 140, 145, and 150 relative to the coordinate system established by the master navigation component 110. The master navigation component 110 provides the lever arm parameters 194 to the flexural model component 112.

The master navigation component 110 synchronizes the navigation measurement data of the slave navigation components 115, 120, 125, and 130 as a function of time provided by the slave navigation components 115, 120, 125, and 130 with the navigation measurement data of the master navigation component 110. In one example, the slave navigation component 115 provides a timestamp along with navigation measurement data for the slave navigation component 115. The master navigation component 110 compares the navigation measurement data for the slave navigation component 115 with the navigation measurement data of the master navigation component 110 at a time described by the timestamp. In another example, the master navigation component 110 and the slave navigation components 115, 120, 125, and 130 operate on a synchronized clock, for example, a clock 162. In yet another example, the master navigation component 110 and the slave navigation components 115, 120, 125, and 130 employ timing pulses to synchronize the navigation measurement data of the master navigation component 110 with the navigation measurement data of the slave navigation components 115, 120, 125, and 130.

The slave navigation components 115, 120, 125, and 130 determine navigation parameters (e.g., orientation, position, and velocity) of the sensors 135, 140, 145, and 150. The slave navigation components 115, 120, 125, and 130 compensate the output of the sensors 135, 140, 145, and 150 based on the orientation, position, and/or velocity of the sensors 135, 140, 145, and 150. The slave navigation components 115, 120, 125, and 130 communicate with the master navigation component 110 to provide the navigation measurement data of the slave navigation components 115, 120, 125, and 130 to the master navigation component 110. The slave navigation components 115, 120, 125, and 130 receive corrected navigation measurement data of the slave navigation components 115, 120, 125, and 130 from the master navigation component 110. The slave navigation components 115, 120, 125, and 130 employ the corrected navigation measurement data of the slave navigation components 115, 120, 125, and 130 to describe the position of the sensors 135, 140, 145, and 150 with respect to the coordinate system established by the master navigation component 110. For example, the slave navigation component 115 employs the corrected navigation measurement data of the slave navigation component 115 to determine motion of the sensor 135 relative to the coordinate system established by the master navigation component 110.

An illustrative description of exemplary operation of the apparatus 100 is presented, for explanatory purposes.

Figure 2:
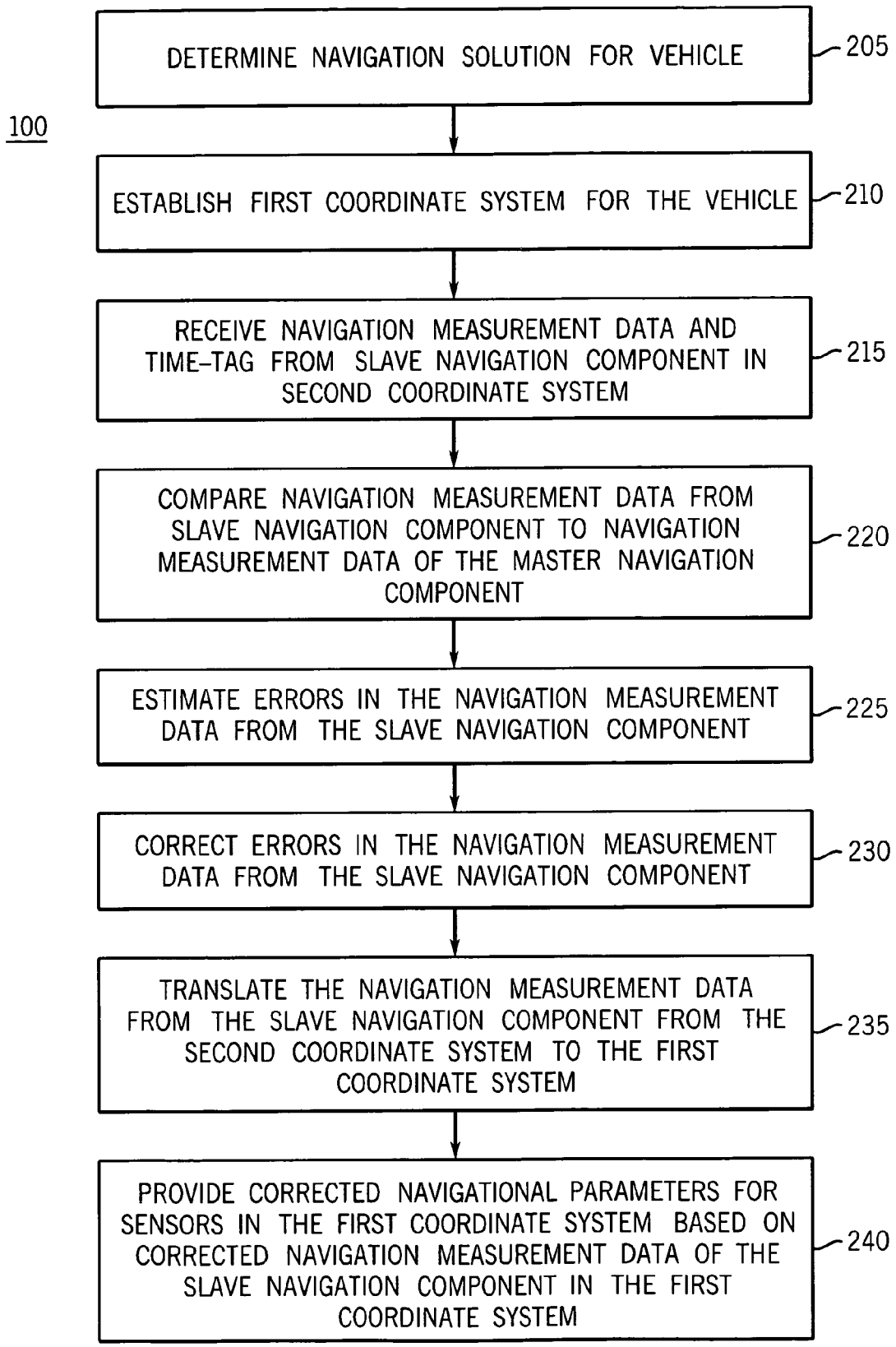
FIG. 2 is a representation of an exemplary process flow for providing corrected navigational parameters for the sensors from the master navigation component to the slave navigation components of the apparatus of FIG. 1.

Turning to FIG. 2, in STEP 205, the master navigation component 110 determines a navigation solution as a function of time for the vehicle 105. In STEP 210, the master navigation component 110 employs navigation measurement data and optional data from the external positioning component 155 to establish a coordinate system for the vehicle 105, for example, a first coordinate system, in relation to the Earth. In STEP 215, the master navigation component 110 receives navigation measurement data with respect to a coordinate system established by the slave navigation component 115, for example, a second coordinate system, and time-tag from the slave navigation component 115 for the sensor 135. The master navigation component 110 employs the time-tag to determine the navigation measurement data of the master navigation component 110 at a time described by the time-tag. In STEP 220, the master navigation component 110 compares the navigation measurement data of the slave navigation component 115 at the time described by the time-tag to the navigation measurement data of the master navigation component 110 at the time described by the time-tag. The navigation measurement data of the master navigation component 110 at the time described by the time-tag in one example comprises navigation measurement data of the master navigation component 110 adjusted by one or more lever arms between the master navigation component 110 and the slave navigation components 115, 120, 125, and 130, as described herein.

In STEP 225, the master navigation component employs a Kalman filter to estimate errors in the navigation measurement data from the slave navigation component 115. In STEP 230, the master navigation component 110 corrects the errors in the navigation measurement data from the slave navigation component 115. In STEP 235, the master navigation component 110 translates the corrected navigation measurement data for the slave navigation component 115 from the coordinate system established by the slave navigation component 115, (e.g., the second coordinate system) to the coordinate system established by the master navigation component 110 (e.g., the first coordinate system). In STEP 240, the master navigation component 110 employs the corrected and translated navigation measurement data for the slave navigation component 115 in the first coordinate system to provide navigation parameters for the sensor 135, for example, orientation, position, and velocity, in the coordinate system established by the master navigation component 110.

Figure 3:
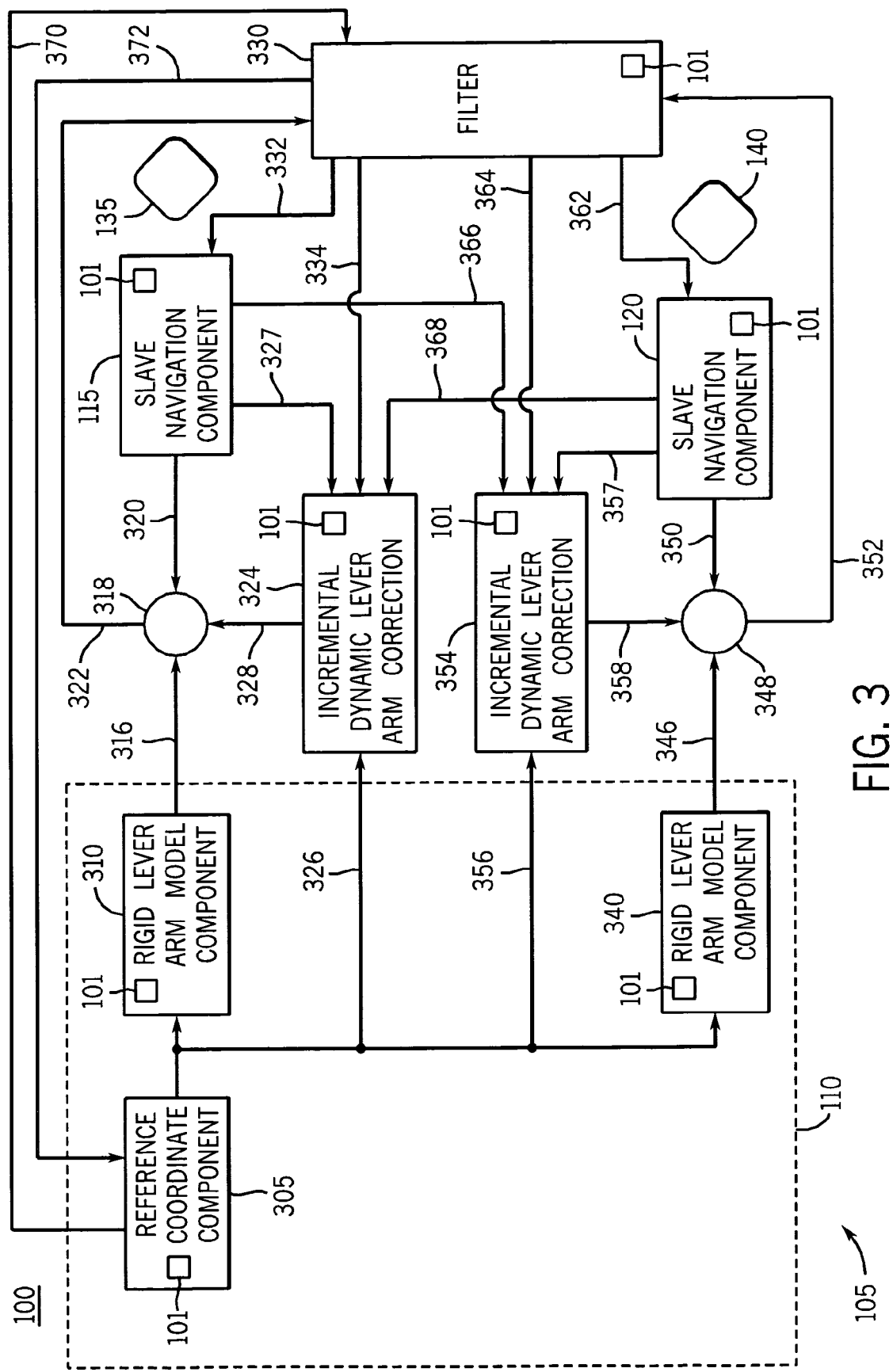
FIG. 3 is a representation of one implementation of one or more reference coordinate components and one or more rigid lever arm model components of the master navigation component, the slave navigation components, the sensors, the external positioning components, one or more incremental dynamic lever arm correction components, and one or more filters of the apparatus of FIG. 1.

Turning to FIG. 3, the master navigation component 110 in one example comprises one or more reference coordinate components 305 and one or more rigid lever arm model components 310 and 340. The reference coordinate component 305 establishes a coordinate system for the vehicle 105. The rigid lever arm model component 310 comprises a base-line static position for the slave navigation component 115. The rigid lever arm model component 310 determines a base-line static lever arm for the slave navigation component 115 based on the base-line static position. The base-line static lever arm for the slave navigation component 115 comprises a three-dimensional position distance, or vector, between the master navigation component 110 and the slave navigation component 15. The rigid lever arm model component 310 cooperates with the reference coordinate component 305 to project the base-line static lever arm for the slave navigation component 115 into the coordinate system established by the reference coordinate component 305 to determine a translated static lever arm for the slave navigation component 115. The rigid lever arm model component 310 sends the translated static lever arm for the slave navigation component 115 as output 316 to a summing node 318.

The slave navigation component 115 determines navigation measurement data for the slave navigation component 115 in reference to a coordinate system established by the slave navigation component 115. The slave navigation component 115 sends as output 320, the navigation measurement data for the slave navigation component 115 in reference to the coordinate system established by the slave navigation component 115 to the summing node 318. The summing node 318 combines the output 316 from the rigid lever arm model component 310 with the output 320 from the slave navigation component 115 to produce as output 322, navigation measurement data for the slave navigation component 115 in reference to the coordinate system established by the reference coordinate component 305.

The output 322 comprising the navigation measurement data for the slave navigation component 115 in reference to the coordinate system established by the reference coordinate component 305 is enhanced through employment of an incremental dynamic lever arm correction component 324. The incremental dynamic lever arm correction component 324 comprises a model describing reactions of the vehicle 105 during motion. The incremental dynamic lever arm correction component 324 employs the model to provide positions for the slave navigation components 115 and 120 in relation to the reactions of the vehicle 105 during motion. For example, while in motion, the vehicle 105 reacts by bending. The bending of the vehicle 105 alters a lever arm (i.e., the three-dimensional distance vector) between the master navigation component 110 and the slave navigation component 115. As the vehicle 105 bends, the lever arm between the master navigation component 110 and the slave navigation component 115 changes.

The incremental dynamic lever arm correction component 324 receives as input, an output 326 from the reference coordinate component 305, and an output 327 from the slave navigation component 115. The output 326 comprises the coordinate system established by the reference coordinate component 305. The output 327 comprises the navigation measurement data for the slave navigation component 115 in reference to the coordinate system established by the slave navigation component 115, similar to the output 320. The incremental dynamic lever arm correction component 324 employs the outputs 326 and 327 to determine a dynamic lever arm for the slave navigation component 115 in reference to the coordinate system established by the reference coordinate component 305. The incremental dynamic lever arm correction component 324 sends as output 328, the dynamic lever arm for the slave navigation component 115 to the summing node 318. The summing node 318 combines the outputs 316, 320, and 328 to produce the output 322. Thus, the summing node 318 generates the output 322 as comprising more accurate navigation measurement data for the slave navigation component 115 in reference to the coordinate system established by the reference coordinate component 305 for the vehicle 105 in motion. The output 328 of the incremental dynamic lever arm correction component 324 obtains more accuracy through employment of a filter 330, for example, a Kalman filter, as will be discussed herein.

The filter 330 receives as input, the output 322 from the summing node 318. The filter 330 compares the output 322 for a given timestamp (i.e., the navigation measurement data for the slave navigation component 115 in reference to the coordinate system established by the reference coordinate component 305) with the navigation measurement data from the reference coordinate component 305 at the given timestamp. The filter 330 estimates errors in the output 322. The filter 330 provides as output 332, corrected navigation measurement data for the slave navigation component 115 in reference to the coordinate system established by the reference coordinate component 305. The slave navigation component 115 employs the output 332 to determine orientation, position, and velocity of the sensor 135 with respect to the coordinate system established by the reference coordinate component 305. The slave navigation component 115 employs the output 332 to adjust the coordinate system established by the slave navigation component 115. In addition, the filter 330 sends as output 334, the corrected navigation measurement data for the slave navigation component 115 in reference to the coordinate system established by the reference coordinate component 305 to the incremental dynamic lever arm correction component 324. The incremental dynamic lever arm correction component 324 employs the output 334 to correct the output 328, the dynamic lever arm for the slave navigation component 115. Thus, the incremental dynamic lever arm correction component 324, the slave navigation component 115 and the filter 330 cooperate to iteratively align a coordinate system of the slave navigation component 115 with the coordinate system established by the reference coordinate component 305.

The slave navigation component 120, the sensor 140, the reference coordinate component 305, rigid lever arm model component 340, summing node 348, incremental dynamic lever arm correction component 354, and outputs 346, 350, 352, 358, 357, 362, and 364 interact in a similar fashion to the slave navigation component 115, the sensor 135, the reference coordinate component 305, the rigid lever arm model component 310, the summing node 318, the incremental dynamic lever arm correction component 324, outputs 316, 320, 322, 326, 327, 328, 332 and 334. The reference coordinate component 305, the rigid lever arm model components 310 and 315, incremental dynamic lever arm correction components 324 and 354, and the filter 330, comprise one or more instances of a recordable data storage medium 101, as described herein.

Referring still to FIG. 3, the slave navigation component 115 sends as output 366, the navigation measurement data for the slave navigation component 115 to the incremental dynamic lever arm correction component 354. The incremental dynamic lever arm correction component 354 employs the output 366 to provide increased accuracy of the dynamic lever arm for the slave navigation component 120 in reference to the coordinate system established by the reference coordinate component 305. The slave navigation component 120 sends as output 368, the navigation measurement data for the slave navigation component 120 to the incremental dynamic lever arm correction component 324. The incremental dynamic lever arm correction component 324 employs the output 368 to provide increased accuracy of the dynamic lever arm for the slave navigation component 115 in reference to the coordinate system established by the reference coordinate component 305.

Referring again to FIG. 3, the filter 330 receives as input, navigation measurement data from the master navigation component 110, and the slave navigation components 115 and 120. The filter 330 receives as input, output 370 from the reference coordinate component 305, the output 322 from the slave navigation component 115, and the output 352 from the slave navigation component 120. The filter 330 employs the outputs 322, 352, and 370 to establish a coordinate system. For example, the filter 330 combines the outputs 322, 352, and 370 to establish the coordinate system, as will be appreciated by those skilled in the art. The filter 330 estimates errors in navigation measurement data received from the reference coordinate component 305, and the slave navigation components 115 and 120, and corrects the errors.

The filter 330 sends as output 372, the corrected navigation measurement data with respect to the coordinate system established by the filter 330 to the reference coordinate component 305. The reference coordinate component 305 employs the output 372 to adjust a coordinate system established by the reference coordinate component 305. For example, the reference coordinate component 305 employs the output 372 to adjust a base-line coordinate system established by the reference coordinate component 305. The filter 330 and the reference coordinate component 305 cooperate to align the coordinate system established by the reference coordinate component 305 and the coordinate system established by the filter 330. The filter 330 sends the outputs 332, 334, 362, and 364, the corrected navigation measurement data with respect to the coordinate system established by the filter 330 to the slave navigation components 115 and 120, and the incremental dynamic lever arm correction component 324 and 354.

Figure 4:
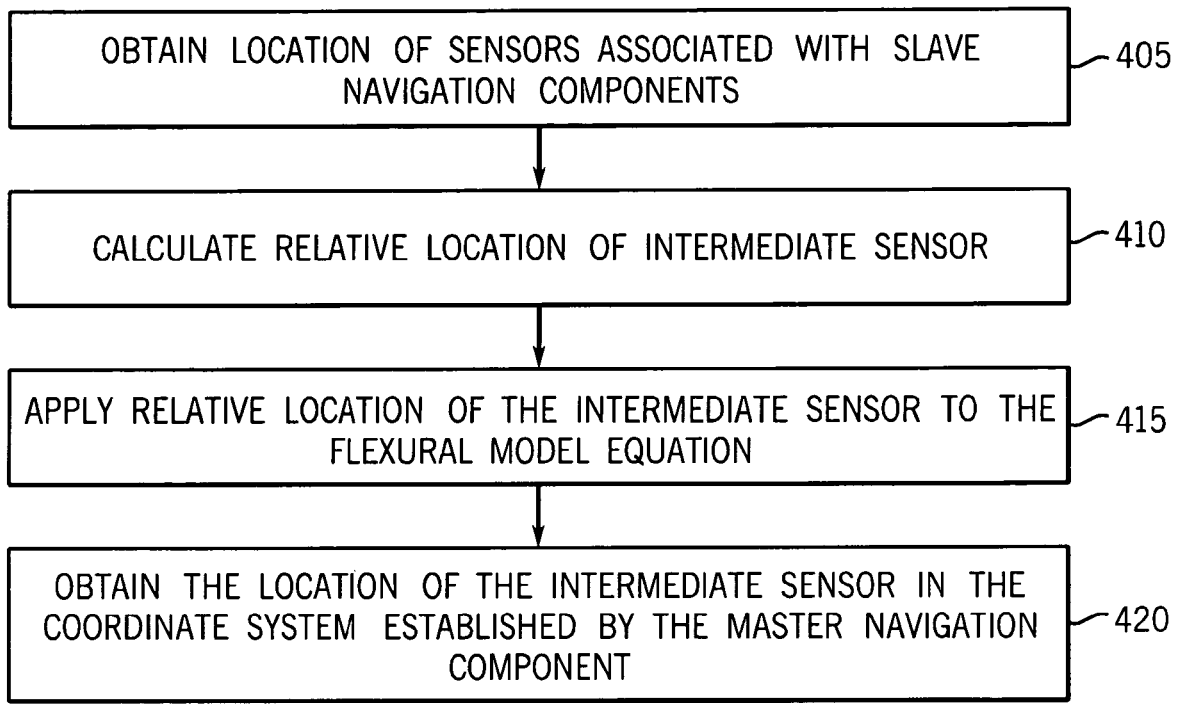
FIG. 4 is a representation of an exemplary process flow of calculating relative positions of the sensors of the apparatus of FIG. 1.

Turning to FIGS. 1 and 4, for example, the sensor 152 comprises an intermediate sensor, for example, the sensor 152 is located between the sensors 135 and 140. In STEP 405, the intermediate location determination component 114 obtains the location of the sensors 135 and 140 relative to the coordinate system established by the master navigation component 110. In STEP 410, the intermediate location determination component 114 calculates a relative location of the sensor 152 with respect to the sensors 135 and 140. In STEP 415, the intermediate location determination component 114 applies the relative location of the sensor 152 to the equation describing the relative displacement of any sensor along the structure of the vehicle 105. In STEP 420, the intermediate location determination component 114 obtains the location of the sensor 152 in the coordinate system established by the master navigation component 110. Upon determining the location of the sensor 152, measurement data obtained by the sensor 152 is compensated to reflect the motion of the sensor 152 as a function of time. Compensating measurement information obtained by the sensors 135, 140, 145, 150, 152, 154, and 156 improves the quality of the measurement information. Combining the compensated measurement information obtained by the sensors 135, 140, 145, 150, 152, 154, and 156, for example, combining signals received by the sensors 135, 140, 145, 150, 152, 154, and 156 at multiple locations through interferometric sensing processing and techniques, produces higher quality results, for example, higher quality image, as will be appreciated by those skilled in the art.

Figure 5:
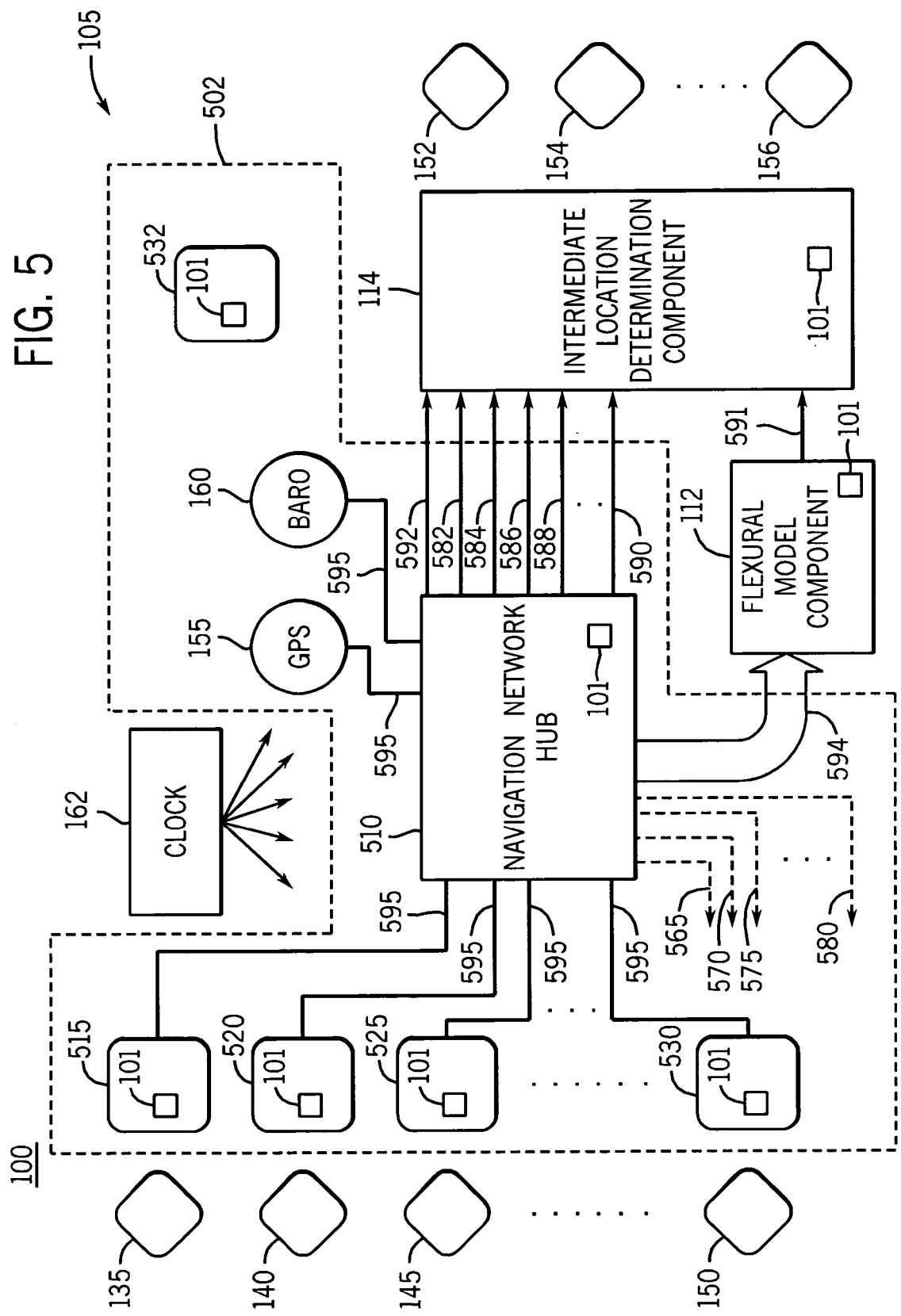
FIG. 5 is another representation of the apparatus of FIG. 1 comprising one or more navigation networks.

Turning to FIGS. 1, 4, and 5, the vehicle 105 comprises a navigation network 502. The navigation network 502 comprises a navigation network hub 510, and one or more navigation components 515, 520, 525, 530, and 532. The navigation components 515, 520, 525, 530, and 532 in one example comprise navigation components of varying degrees of accuracy. For example, the navigation components 515, 520, and 525 comprise high performance navigation systems, similar to the master navigation component 110, and the navigation components 530 and 532 comprise lower performance navigation systems, similar to the slave navigation components 115, 120, 125, and/or 130. The navigation components 515, 520, 525, 530, and 532 obtain navigation measurement data for the navigation components 515, 520, 525, 530, and 532. The navigation components 515, 520, 525, 530, and 532 cooperate to determine navigation parameters (i.e., orientations, positions, and velocities) for sensors 135, 140, 145, 150, 152, 154, and 156.

The navigation network hub 510 in one example receives navigation measurement data from the navigation components 515, 520, 525, 530, and 532. The navigation network hub 510 employs the navigation measurement data from the navigation components 515, 520, 525, 530, and 532 to establish a coordinate system, for example, a first coordinate system, for the vehicle 105. The navigation network hub 510 determines one or more navigational parameters (i.e., orientations, positions, and velocities) for the sensors 135, 140, 145, 150, 152, 154, and 156 with respect to the coordinate system established by the navigation network hub 510 (i.e., the first coordinate system). The navigation network hub 510 provides translated navigation parameters (i.e. orientations, velocities, and positions) of the sensors 135, 140, 145, 150, 152, 154, and 156 in the coordinate system established by the navigation network hub 510 as illustrated by the outputs 582, 584, 586, 588, and 590. The navigation network hub 510 provides the orientation of the coordinate system established by the navigation network hub 510 as output 592. The navigation network hub 510 provides lever arm parameters 594 to the flexural model component 112. The flexural model component 112 applies the lever arm parameters 594 to equations describing the reaction of the vehicle 105 while in motion. The flexural model component 594 provides as output 591, the equations describing the relative displacement of the sensors 135, 140, 145, and 150 along the structure of the vehicle 105 as a function of time with respect to the coordinate system established by the navigation network hub 510.

The intermediate location determination component 514 employs the outputs 582, 584, 586, 588, and 590 as well as the output 591 to determine navigation parameters for intermediate sensors, for example, the sensors 152, 154, and 156. For example, the output 591 describes the bending of the vehicle 105. The outputs 582, 584, 586, 588, and 590 describe the navigation parameters of the sensors 135, 140, 145, and 150. The intermediate location determination component 514 in one example comprises locations of the sensors 152, 154, and 156. The intermediate location determination component 514 employs the bending of the vehicle 105 (described by the output 594) to determine equations describing navigation parameters between sensors 135, 140, 145, and 150. From the equations describing the navigation parameters between the sensors 135, 140, 145, and 150, the intermediate location determination component 514 employs the location of the sensors 152, 154, and 156 to determine navigation parameters for the sensors 152, 154, and 156. The navigation network hub 510 and the navigation components 515, 520, 525, 530, and 532 comprise one or more instances of a recordable data storage medium 101, as described herein.

The navigation network hub 510 and the navigation components 515, 520, 525, and 530 communicate through employment of one or more instances of a network bus 595. In one example, the network bus 595 comprises a high speed transmission bus. In another example, the network bus 595 comprises an Ethernet communication means. The navigation components 515, 520, 525, and 530 in one example employ the network bus 595 to transmit navigation measurement data to the navigation network hub 510. In one example, the navigation network hub 510 employs the network bus 595 to transmit corrected navigation measurement data 565, 570, 575, and 580 to the navigation components 515, 520, 525, and 530. In another example, the navigation network hub 510 employs the network bus 595 to provide outputs 582, 584, 586, 588, 590, and 592. In yet another example, the navigation network hub 510 employs the network bus 595 to communicate with the external positioning components 155 and 160. The navigation network hub 510 employs a standard protocol over the network bus 595 to provide a common interface to multiple external components, for example, the navigation components 515, 520, 525, and 530, the external positioning components 155 and 160, and one or more vehicle computers (not shown).

Figure 6:
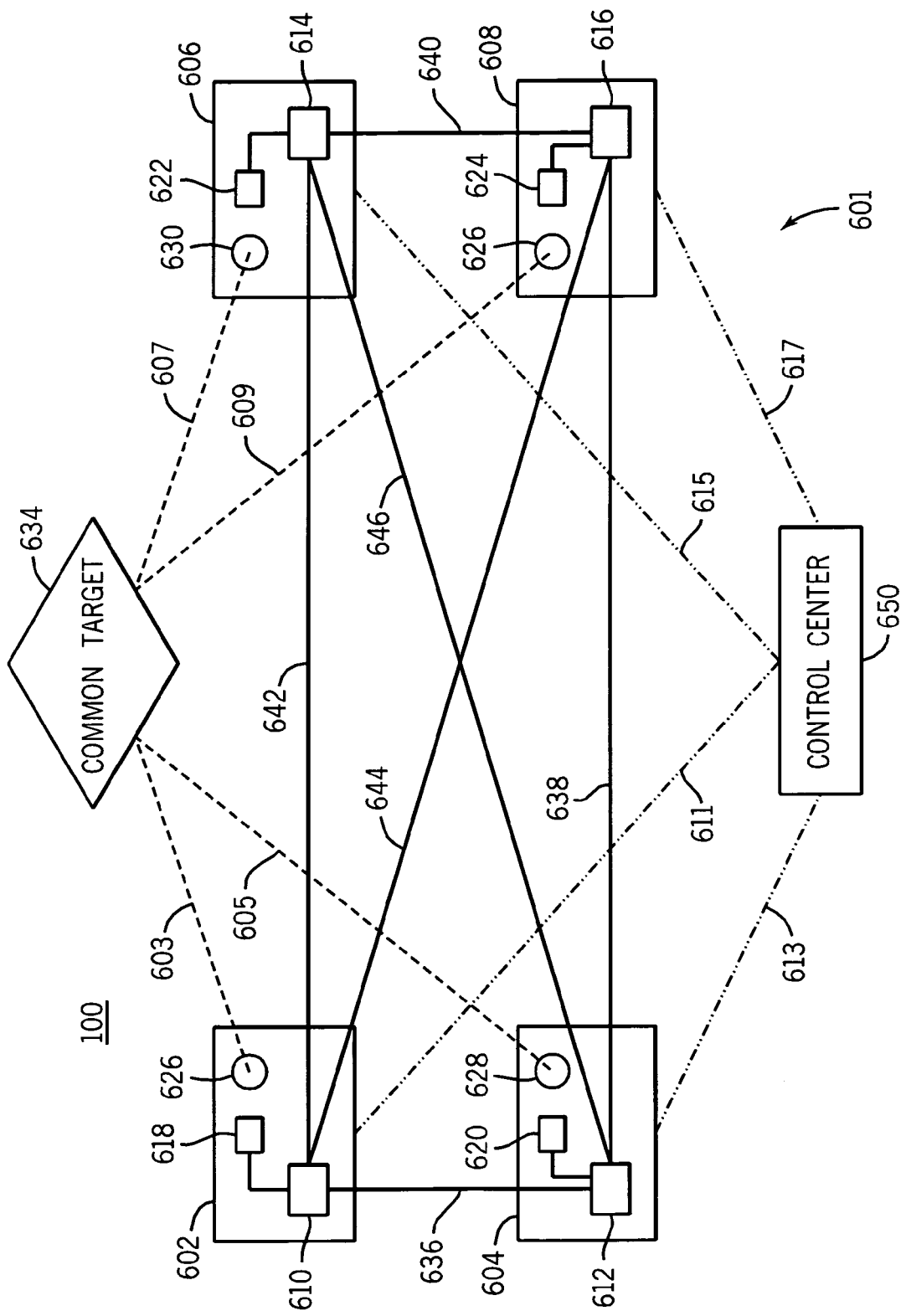
FIG. 6 is a representation of another implementation of the navigation network of the apparatus of FIG. 5.

Turning to FIGS. 1 and 6, the apparatus 100 comprises one or more vehicles 602, 604, 606, and 608, one or more master navigation components 610, 612, 614, and 616, one or more slave navigation components 618, 620, 622, and 624, one or more sensors 626, 628, 630, and 632, one or more common transmission component 634, one or more communication links 636, 638, 640, 642, 644, and 646, and one or more control centers 650. The vehicles 602, 604, 606, and 608 communicate through employment of the vehicle communication links 636, 638, 640, and 642. The vehicles 602, 604, 606, and 608 communicate with the control center 650 through employment of center communication links 611, 613, 615, and 617. The vehicle communication links 636, 638, 640, and 642 and the data links 611, 613, 615, and 617 in one example comprise satellite communications, tactical command data link ("TCDL"), Link 16, and Advanced Information Architecture ("AIA"). The vehicles 602, 604, 606, and 608 are similar to the vehicle 105 of the FIG. 1. The master navigation components 610, 612, 614, and 616 are similar to the master navigation component 110 of the FIG. 1. The slave navigation components 618, 620, 622, and 624 are similar to the slave navigation components 115, 120, 125, and 130 of the FIG. 1. The sensors 626, 628, 630, and 632 are similar to the sensors 135, 140, 145, 150, 152, 154, and 156 of the FIG. 1.

In one example, the vehicles 602, 604, 606, and 608 comprise one or more unmanned vehicles, for example, unmanned airplanes, monitoring the common target 634. For example, the common target 634 comprises a satellite, an object on the ground, a vehicle, a radio emitter, or an acoustic emitter. The control center 650 obtains measurement data from the sensors 626, 628, 630, and 632 of the vehicles 602, 604, 606, and 608. The control center 650 combines the measurement data using interferometric techniques to produce an enhanced representation of the common target 634.

The master navigation components 610, 612, 614, and 616 employ the vehicle communication links 636, 638, 640, and 642 to establish a navigation network 601. The master navigation components 610, 612, 614, and 616 communicate through employment of the navigation network 601 to establish a coordinate system relative to a reference coordinate system for the vehicles 602, 604, 606, and 608. The master navigation components 610, 612, 614, and 616 employ timestamps to establish the coordinate system through employment of the navigation network 601. For example, the master navigation component 610 associates a timestamp with navigation measurement data for the master navigation component 610. The master navigation component 610 employs the communication link 642 to provide the timestamp with the navigation measurement data for the master navigation component 610 to the master navigation component 614. The master navigation component 614 employs the timestamp to compare the navigation measurement data for the master navigation component 610 with navigation measurement data for the master navigation component 614 at a time described by the timestamp. The master navigation components 610, 612, 614, and 616 employ one or more of: a common clock, an atomic clock, or GPS time to timestamp the measurement data.

The master navigation components 610, 612, 614, and 616 employ the Earth as the reference coordinate system. The master navigation components 610, 612, 614, and 616 determine navigation and orientation solutions for the vehicles 602, 604, 606, and 608. For example, the master navigation components 610, 612, 614, and 616 each establish a coordinate system for the vehicles 602, 604, 606, and 608, respectively. The master navigation components 610, 612, 614, and 616 establish the coordinate systems with respect to a reference coordinate system, for example, the Earth. In one example, the master navigation components 610, 612, 614, and 616 employ the reference coordinate system as the coordinate systems established by the master navigation components 610, 612, 614, and 616. In another example, the master navigation components 610, 612, 614, and 616 cooperate to establish a common coordinate system used by each of the master navigation components 610, 612, 614, and 616. The master navigation components 610, 612, 614, and 616 employ the common coordinate system to transpose their individual navigation parameters into the common coordinate system.

The sensors 626, 628, 630, and 632 obtain measurement data on the signals from the common target 634. The master navigation components 610, 612, 614, and 616 translate the measurement data from a coordinate system established by the slave navigation components 618, 620, 622, and 624 into the coordinate system established by the master navigation components 610, 612, 614, and 616. The vehicles 602, 604, 606, and 608 employ the data links 611, 613, 615, and 617 to send the measurement data on the signals to the control center 650 in the coordinate system established by the master navigation components 610, 612, 614, and 616. The control center 650 employs the measurement data from the sensors 626, 628, 630, and 632 in the coordinate system established by the master navigation components 610, 612, 614, and 616 to perform interferometric sensing across the vehicles 602, 604, 606, and 608. For example, the control center 650 employs an interferometric technique to calculate phase differences between the signals received by the sensors 626, 628, 630, and 632 with respect to the coordinate system established by the master navigation components 610, 612, 614, and 616. Based on the phase differences, the control center 634 determines information, for example, orientation, position, velocity, and shape, of the common target 634. Through employment of the coordinate system established by the master navigation components 610, 612, 614, and 616, the control center 650 relates the signals received by the sensors 626, 628, 630, and 632 to an accurate absolute position. The control center 650 employs the accurate absolute position to provide a geolocation or position for the common target 634.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 101 of the master navigation component 110, the slave navigation components 115, 120, 125, and 130, the flexural model component 112, the intermediate location determination component 114, the reference coordinate component 305, the rigid lever arm model components 310 and 315, incremental dynamic lever arm correction components 324 and 354, the filter 330, the navigation network hub 510, and the navigation components 515, 520, 525, 530, and 532. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
    a master navigation component that establishes a first coordinate system for a vehicle in motion; and
    one or more slave navigation components of the vehicle that determine navigation measurement data of the one or more slave navigation components in one or more second coordinate systems;
    wherein the one or more slave navigation components provide the navigation measurement data of the one or more slave components in the one or more second coordinate systems to the master navigation component;
    wherein the master navigation component compares the navigation measurement data of the one or more slave components in the one or more second coordinate systems to navigation measurement data for the master navigation component in the first coordinate system;
    wherein the master navigation component translates the navigation measurement data of the one or more slave navigation components in the one or more second coordinate systems into navigation measurement data of the one or more slave navigation components in the first coordinate system;
    wherein the master navigation component employs the navigation measurement data of the one or more slave navigation components in the first coordinate system to determine one or more navigation parameters in the first coordinate system for one or more sensors of the vehicle at one or more locations;
    wherein the master navigation component receives data from the one or more sensors of the vehicle at the one or more locations of the one or more slave navigation components.

2. The apparatus of claim 1 wherein the master navigation component employs the one or more navigation parameters in the first coordinate system for the one or more sensors of the vehicle to combine with respect to the first coordinate system, the data received from the one or more sensors.

3. The apparatus of claim 1 wherein the master navigation component estimates errors in the navigation measurement data of the one or more slave navigation components in the one or more second coordinate systems through employment of a Kalman filter.

4. The apparatus of claim 3 wherein the master navigation component estimates errors in the navigation measurement data of the one or more slave navigation components in the one or more second coordinate systems.

5. The apparatus of claim 1 wherein the master navigation component is disposed at a first location in a vehicle and a first one of the slave navigation components is disposed at a second location in the vehicle, the first and second coordinate systems being associated with the first and second locations, respectively.

6. The apparatus of claim 5 further comprising a static location component coupled to the master navigation component wherein the static location component provides static information of the distance between the first and second locations, the master navigation component estimates the error in the navigation measurement data of the first slave navigation component at the second location based on the static distance information.

7. The apparatus of claim 5 further comprising a flexural model component coupled to the master navigation component wherein the flexural location component provides dynamic information of the displacement of the second location relative to the first location, the displacement between the first slave navigation component and the master navigation component being variable due to physical deflection of the second location relative to the first location, the master navigation component estimating the error in the navigation measurement data of the first slave navigation component at the second location based on the displacement information.

8. The apparatus of claim 6 further comprising a flexural model component coupled to the master navigation component wherein the flexural model component provides dynamic information of the displacement of the second location relative to the first location based at least partially on the static distance information, the displacement between the first slave navigation component and the master navigation component being variable due to physical deflection of the second location relative to the first location, the master navigation component estimating the error in the navigation measurement data of the first slave navigation component at the second location based on the displacement information.

9. The apparatus of claim 7 wherein the master navigation component corrects the navigation measurement data of the first slave navigation component based on the displacement information.

10. The apparatus of claim 8 further comprising a summation element that receives inputs from the static location component and the flexural model component, the summation element providing an output to the filter that provides estimates of error in the navigation measurement data of the second coordinate system relative to the first coordinate system to the master navigation component.

11. The apparatus of claim 8 wherein the master and slave navigation components each includes a time synchronization component that encodes master and slave navigation measurement data with time information so that master and slave measurement data as of substantially the same time can be utilized in estimating the error in the navigation measurement data of the first slave navigation component at the second location based on the displacement information.

12. The apparatus of claim 8 further comprising an intermediate location determination component that receives the displacement information relating to the first slave navigation component from the flexural model component, and an intermediate sensor disposed at a third location that is between the first and second locations, the intermediate location determination component determining the displacement of the intermediate sensor based on the displacement information of the first slave navigation component and the spatial relationship of the third location to the first and second locations.

13. A navigation system comprising:
a master navigation component that generates navigation measurement data and establishes a first coordinate system at a first location in a vehicle;
a slave navigation component that generates navigation measurement data and establishes a second coordinate system in a second location in the vehicle where the distance between the first and second locations is variable due to physical deformation of the vehicle;
a flexural model component coupled to the master navigation component where the flexural model component provides dynamic information of the displacement between the first and second locations;
the master navigation component including an error estimator that estimates errors in the navigation measurement data generated by the slave navigation component based on the navigation measurement data generated by the master navigation component and the dynamic distance information provided by the flexural model component;
the master navigation component correcting the navigation measurement data of the slave navigation component based on the error determined by the error estimator;
the master navigation component translating the corrected navigation measurement data of the slave navigation component into navigation measurement data in the first coordinate system;
a first and second sensor each generate sensor data and are located at the first and second locations, respectively;
the master navigational component combining sensor data from the second sensor based on the corrected navigation measurement data of the slave navigation component with the sensor data from the first sensor based on the navigational measurement data of the master navigation component into a resulting combined sensor data.

14. The system of claim 13 further comprising a static location component coupled to the master navigation component wherein the static location component provides static information of the displacement between the first and second locations, the flexural model component receiving the static displacement information as an input.

15. The system of claim 14 further comprising a summation element that receives inputs from the static location component and the flexural model component, the summation element providing an output to the filter that provides estimates of error in the navigation measurement data of the second coordinate system relative to the first coordinate system to the master navigation component.

16. The system of claim 13 wherein the master and slave navigation components each includes a time synchronization component that encodes master and slave navigation measurement data with time information so that master and slave measurement data as of substantially the same time can be utilized in estimating the error in the navigation measurement data of the first slave navigation component at the second location based on the displacement information.

17. The system of claim 13 further comprising an intermediate sensor disposed at a third location that is between the first and second locations, and an intermediate location determination component that receives the displacement information relating to the first slave navigation component from the flexural model component, the intermediate location determination component determining the displacement of the intermediate sensor based on the relationship of the displacement information relating to the first slave navigation component and the displacement of third location to at least one of the first and second locations.

18. A method for combining sensor data comprising the steps of:
generating master navigation measurement data with a first coordinate system at a first location of a first sensor in a vehicle;
generating slave navigational measurement data with a second coordinate system in a second location of a second sensor in the vehicle where the displacement between the first and second locations is variable due to physical deformation of the vehicle;
storing a flexural model representative of the displacement of the second location relative to the first location due to the physical deformation of the vehicle;
determining dynamic information of the displacement between the first and second locations based on the flexural model;
estimating errors in the slave navigation measurement data based on the master navigation measurement data and the dynamic displacement information;
correcting the slave navigation measurement data based on the estimated error;
translating the corrected slave navigation measurement data into navigation measurement data in the first coordinate system;
the first arid second sensor each generating sensor data;
combining sensor data from the second sensor based on the corrected navigation measurement data of the slave navigation component with the sensor data from the first sensor based on the navigation measurement data of the master navigation component into a resulting combined sensor data.

19. The method of claim 18 wherein sensor data is combined interferometrically.

20. The method of claim 18 further comprising generating static information of the distance between the first and second locations, the estimating error step estimating errors in the slave navigation measurement data based on the static information and dynamic displacement information.

21. The method of claim 20, wherein an intermediate sensor is disposed at a third location that is between the first and second locations, further comprising the step of determining the displacement of the intermediate sensor based on the relationship of the displacement information of the second location and the distance of the third location to at least one of the first and second locations.

22. The method of claim 18 further comprising the step of encoding master and slave navigation measurement data with time information so that master and slave measurement data of substantially the same time are used in estimating the error in the navigation measurement data of the first slave navigation component at the second location based on the dynamic displacement information.

23. The method of claim 18 further comprising the step of encoding the sensor data with time information so that sensor data of substantially the same time are used in generating the combined sensor data.

24. The method of claim 23 wherein all of the steps are performed in a first vehicle, the method further comprising performing the steps performed in the first vehicle in a second vehicle resulting in a further combined sensor data associated with the second vehicle, and combining the combined sensor data of the first vehicle with the further combined sensor data of the second vehicle to produce resultant sensor data benefiting from measurements made from the first and second vehicles.

25. The method of claim 24 wherein data from the first and second vehicles are referred to a common coordinate system.

26. A method for combining sensor data comprising the steps of:
generating master navigation measurement data with a first coordinate system at a first location in a vehicle;
generating sensor data from two or more sensors in the vehicle;
generating one or more sets of slave navigation measurement data with one or more second coordinate systems in one or more second locations of sensors in the vehicle where the displacements between the first and one or more second locations are variable due to physical deformation of the vehicle;
storing flexural models representative of the displacements of the one or more second locations relative to the first location due to the physical deformation of the vehicle;
determining dynamic information of the displacements between the first and the one or more second locations based on the flexural models;
estimating errors in the slave navigation measurement data based on the master navigation measurement data and the dynamic displacement information;
correcting the slave navigation measurement data based on the estimated errors;
translating the corrected slave navigation measurement data into navigation measurement data in the first coordinate system;
combining sensor data from the two or more sensors based on their navigation parameters as determined from corrected navigation measurement data of the one or more slave navigation measurement data.

27. The method of claim 26 wherein the sensor data is combined interferometrically.

28. The method of claim 26 further comprising generating static information of the distance between the first and one or more second locations, the estimating error step estimating errors in the slave navigation measurement data based on the static information and dynamic displacement information.

29. The method of claim 26, wherein one or more intermediate sensors are disposed at one or more third locations, further comprising the step of determining the displacement of the one or more intermediate sensors based on the relationship of the displacement information of the one or more second locations and the distance of the one or more third locations to at least one of the first and second locations.

30. The method of claim 26 further comprising the step of encoding master and slave navigation measurement data with time information so that master and slave measurement data of substantially the same time are used in estimating the error in the navigation measurement data of the first slave navigation component at the second location based on the dynamic displacement information.

31. The method of claim 28 further comprising the step of encoding master and slave navigation measurement data with time information so that master and slave measurement data of substantially the same time are used in estimating the error in the navigation measurement data of the first slave navigation component at the second location based on the static displacement information.

32. The method of claim 26 further comprising the step of encoding the sensor data with time information so that sensor data of substantially the same time are used in generating the combined sensor data.

33. The method of claim 32 wherein all of the steps are performed in a first vehicle, the method further comprising performing the steps performed in the first vehicle in a second vehicle resulting in a further combined sensor data associated with the second vehicle, and combining the combined sensor data of the first vehicle with the further combined sensor data of the second vehicle to produce resultant sensor data benefiting from measurements made from the first and second vehicles.

34. The method of claim 32 wherein all of the steps are performed in a first and second vehicle, the method further comprising performing the steps performed in the first and second vehicles in one or more additional vehicle resulting in a further combination of sensor data associated with the first, second, and one or more additional vehicles to produce resultant sensor data benefiting from measurements made from the first, second, and one or more additional vehicles, and wherein data from the first, second and one or more additional vehicles are referred to a common coordinate system.

35. A method for combining sensor data from multiple vehicles comprising the steps of:
generating master navigation measurement data with a first coordinate system in a first location in at least one vehicle;
generating sensor data from one or more sensors in each vehicle;
storing flexural models representative of the displacements of the one or more sensor locations relative to the first location due to the physical deformation of the vehicle;
determining dynamic information of the displacements between the first and the one or more second locations based on the flexural models;
estimating errors in the navigation measurement data for each of the sensor locations based on the master navigation measurement data and the dynamic displacement information;
communicating between vehicles to establish common reference coordinate system;
determining sensor locations in the common reference systems;
communicating sensor and sensor location data to a central processing system;
combining sensor data from the one or more sensors in the one or more vehicles.

36. The method of claim 35 wherein sensor data is combined interferometrically.

* * * * *